(12) United States Patent
Yang

(10) Patent No.: US 8,233,463 B2
(45) Date of Patent: Jul. 31, 2012

(54) METHOD FOR CONSTRUCTING VIRTUAL BACKBONE IN WIRELESS SENSOR NETWORK

(75) Inventor: Jun-Mo Yang, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 223 days.

(21) Appl. No.: 12/138,693

(22) Filed: Jun. 13, 2008

(65) Prior Publication Data
US 2008/0310325 A1 Dec. 18, 2008

(30) Foreign Application Priority Data
Jun. 15, 2007 (KR) .................. 10-2007-0058874

(51) Int. Cl.
*H04W 4/00* (2009.01)
(52) U.S. Cl. ............... 370/338; 455/445; 455/412.2; 455/420; 455/425
(58) Field of Classification Search ............... None
See application file for complete search history.

(56) References Cited

U.S. PATENT DOCUMENTS

| | | | |
|---|---|---|---|
| 6,839,541 B2 * | 1/2005 | Alzoubi et al. | 455/41.2 |
| 6,901,251 B1 * | 5/2005 | Kiessling et al. | 455/410 |
| 7,590,611 B2 * | 9/2009 | Hur et al. | 706/52 |
| 7,593,376 B2 * | 9/2009 | D'Amico et al. | 370/338 |
| 2003/0151513 A1 * | 8/2003 | Herrmann et al. | 340/573.1 |
| 2006/0268745 A1 * | 11/2006 | Hur et al. | 370/254 |
| 2006/0268746 A1 * | 11/2006 | Wijting et al. | 370/254 |
| 2007/0177511 A1 * | 8/2007 | Das et al. | 370/238 |

OTHER PUBLICATIONS

Wu, Jie; "Extended Dominating-Set-Based Routing in Ad Hoc Wireless Networks with Unidirectional Links;" IEEE Transaction on Parallel and Distributed Computing; Apr. 2002.*

Kim, Bonam, et al.; "Energy-Aware Connected Dominating Set Construction in Mobile Ad Hoc Networks;" 14th International Conference on Computer Communications and Networks (ICCN 2005); San Diego, CA; Oct. 2005.*

Ni Sze-Yao, et al.; "The Broadcast Storm Problem in a Mobile Ad Hoc Network;" MOBIle COMputing Network (MOBICOM); Seattle, Washington; Aug. 1999.*

Ni, Sze-Yao, et al.; "The Broadcast Storm Problem in a Mobile Ad Hoc Network;" MOBIle COMputing Network (MOBICOM); Seattle, Washington; Aug. 1999.

(Continued)

*Primary Examiner* — Ayaz Sheikh
*Assistant Examiner* — Faiyazkhan Ghafoerkhan
(74) *Attorney, Agent, or Firm* — Cha & Reiter, LLC

(57) ABSTRACT

Disclosed is a method for constructing a virtual backbone in a Wireless Sensor Network (WSN). The method including the steps of setting a 'Dominator' status for a gateway or a sink node within the WSN, setting a 'CoveredByDominator' status for each neighbor node positioned in the transmission range of a node for which the 'Dominator' status is set, and setting a 'NULL' status for each of the other nodes, transmitting a beacon frame by periods from each node to neighbor nodes thereof within the WSN, receiving, by each node in the 'CoveredByDominator' status, the beacon frame from neighbor nodes thereof in the 'NULL' status, computing a time duration of a defer timer, and enabling the defer timer to operate by the computed time duration; and changing, to the 'Dominator' status, a status of a node whose defer timer expires earliest among the nodes all having the 'CoveredByDominator' status.

21 Claims, 5 Drawing Sheets

OTHER PUBLICATIONS

Kim, Bonam, et al.; "Energy-Aware Connected Dominating Set Construction in Mobile Ad Hoc Networks;" 14th International Conference on Computer Communications and Networks (ICCN 2005); San Diego, CA; Oct. 2005.

* cited by examiner

METHOD FOR CONSTRUCTING VIRTUAL BACKBONE IN WIRELESS SENSOR NETWORK

CLAIM OF PRIORITY

This application claims the benefit of the earlier filing date, under 35 U.S.C. §119(a), to that patent application entitled "Method for Constructing Virtual Backbone in Wireless Sensor Network," filed in the Korean Intellectual Property Office on Jun. 15, 2007 and assigned Serial No. 2007-58874, the contents of which are incorporated herein by reference.

BACKGROUND OF THE INVENTION

1. Field of the Invention

The present invention relates to a Wireless Sensor Network (WSN), and more particularly to a method for constructing a virtual backbone in consideration of link quality in a WSN.

2. Description of the Related Art

An ad-hoc network conventionally refers to a network structure in which all nodes mutually construct a network in an equal position without any difference in control functions or logical layers, and communicate with one another. Because the ad-hoc network does not use an existing backbone network, and has a limited transmission range, it employs multi-hop communications to reach all the devices or nodes in the network. Hence, each node is not only a host, but also operates as a router. As there is no limitation on an object for which a communication link is constructed, it is possible to configure a flexible network.

The technological evolution of a wireless ad-hoc network as described above has provided the technological foundation of various applications, such as a Wireless Sensor Network (WSN), a Wireless Mesh Network (WMN) (reference. IEEE 802.15.4 Specification, 2003), and the like. The WSN and the WMN show technological differentiation from other wireless data communications networks (i.e., infrastructure), in that a node is arbitrarily arranged over the WSN and the WMN simultaneously performs a role of a host and a role of a router. It is expected that demand for the WSN and the WMN continues to increase even henceforth, due to the development and the advantage of an aspect of cost efficiency in various wireless data communication arts, such as Zigbee, Radio Frequency IDentification (RFID), Ultra Wide Band (UWB), Worldwide interoperability for Microwave Access (WiMAX), and so on.

However, a broadcast storm phenomenon can occur in such networks due to causes including a failure of a network device, creation of a loop across the overall network, and the like. If the broadcast storm occurs, since the overall bandwidth of the network achieves a saturation state, the network can be faced with an inoperable state. To relieve the broadcast storm problem, and to improve the efficiency of the overall network, there is a method for constructing a virtual backbone.

The virtual backbone has been presented as a method for solving the broadcast storm problem which occurs in the WSN and in the WMN (reference: S.-Y. Ni, Y.-C. Tseng, T.-S. Chen, and J.-P. Sheu, "The Broadcasting Storm Problem in Mobile Ad-hoc Network, MOBIle COMputing Network (MOBICOM)", pp. 151-162, August 1999), and has the value which can be reused as routing and a backup route in a network. As a method for constructing the virtual backbone, a method called a "Connected Dominating (or Dominator) Set (CDS)" has been proposed, and this approach can be called the same method as the cluster formation of a network topology (reference: S.-Y. Ni, Y.-C. Tseng, T.-S. Chen, and J.-P. Sheu, "The Broadcasting Storm Problem in Mobile Ad-hoc Network, MOBIle COMputing Network (MOBICOM)", pp. 151-162, August 1999).

FIG. 1 is an exemplary view illustrating a backbone in a wireless ad-hoc network, and shows examples related to the construction of a virtual backbone and a CDS in the wireless ad-hoc network. To describe a concept of the virtual backbone, let us define some terms.

a neighbor node: A neighbor node indicates any node which is placed within a transmission range from a node.
U: a set of all nodes which are placed within a network
a CDS: a Connected Dominating Set
N[i]: a set of neighbor nodes and a node itself at a node i
a virtual backbone: when $\cup$ N[s]=U, and $\forall s \in$ CDS, it is determined that a virtual backbone is successfully constructed. Any node in a CDS can reach (i.e., communicate with) another node through the CDS.

With reference to FIG. 1, the wireless ad-hoc network has a form in which multiple mobile nodes 120 are connected to one another via multiple wireless links 140, and as described above, includes back nodes 130, each of which is formed by a set of dominator nodes and has the transmission range 110 of only each backbone node. As illustrated in FIG. 1, configuring the virtual backbone corresponds to a task of constructing a topology of a network, and FIG. 1 shows an example of the configuration of the virtual backbone using a concept of CDS. Methods for configuring a CDS in various formats have been proposed.

An approach which has been proposed in the incipient stage of CDS research, corresponds to a scheme of configuring a CDS on the premise that a topology of the overall network has already been known. A third scheme corresponds to a method in which information that is 2-hops away from the respective nodes is used. The latest approach describes a method for configuring a CDS by using only localized information, i.e. 1-hop away information. Basically, the configuration of an optimal CDS corresponds to a problem of Non-deterministic Polynomial-time hard (NP-hard), and the abovementioned methods correspond to heuristic approaches in which their respective properties are utilized. Fundamentally, since an assumption that a topology of the overall network can be known is not suitable in a Mobile Ad-hoc NETwork (MANET), a detailed description of this will be omitted.

A Core Extraction Distributed Ad-hoc Routing (CEDAR) protocol configures the CDS, exchanging information on dominators, the number of neighbor nodes, the number of neighbor nodes which select themselves as dominators, etc., through a beacon. By the selection of neighbor nodes, an individual node can be converted into a dominator.

A method which has been proposed (see J. Wu, "Extended Dominating-set-based Routing in Ad-hoc Wireless Networks with Unidirectional Links, IEEE Transaction on Parallel and Distributed Computing", 22, 1-4, pp. 327-340, 2002) corresponds to a two-step process. In the first step, by using a marking process, an initial CDS is configured. In the second step, each node exchanges its neighbor list with its neighbor nodes. In this method, if all neighbor nodes of each node are included in a union of neighbor nodes of two neighbor nodes connected in a pair wise direction, each node removes itself from the initial CDS. The above method sets a goal of configuring a minimal CDS by using a heuristic approach like this.

B. Kim, J. Yang, D. Zhou, and M.-T. Sun, "Energy-aware Connected Dominating Set Construction in Mobile Ad-hoc Networks", Fourteenth International Conference on Computer Communications and Networks (ICCN 2005), San Diego, Calif., October 2005, disclosed technology that sets a goal of configuring a minimal CDS by using a timer.

Meanwhile, in a mobile network, a Media Access Control (MAC) protocol which enables wireless hosts to efficiently share each wireless channel is required, and this scheme should be accomplished in a distributed manner. A Carrier Sense Multiple Access with Collision Avoidance (CSMA/CA) protocol corresponds to a distributed MAC protocol, and is being variously used at present.

FIG. 2 is timing diagram illustrating a transmission operation of each node according to the elapse of time in a CSMA/CA scheme. With reference to FIG. 2, in the CSMA/CA scheme, let us look around how a timer is used. An MAC protocol employing the CSMA/CA scheme uses a Automatic Repeat reQuest (ARQ) scheme which enables an acknowledgement responding to transmitted data to be received within a limited time so as to guarantee reliable communications during the transmission of frames.

Referring to FIG. 2, a sender waits for a time interval of a Dcf Inter-Frame Space (DIFS) 210, and then transmits a Request To Send (RTS) 220. If a receiver is ready for reception, it waits by a time interval of a Short Inter-Frame Space (SIFS) 230, and then transmits a Clear To Send 240 to give an answer. The sender waits for the SIFS 230, and then transmits data 250. On receiving the data 250, the receiver waits for the SIFS 230, and then gives an answer with an Acknowledgement (ACK) 260.

In the MAC protocol employing the CSMA/CA scheme, a station which desires to transmit frames first senses the state of a channel. If it is determined that the channel is in an idle state, (i.e., the channel is not used by another station) the station transmits frames. If it is a busy state, in which the channel is used by another station, the station defers the transmission of the frames during some time interval, and then retries the transmission. In the case of a busy state in this manner, a process of deferring the transmission of frames is referred to as a back-off process, and a time interval for which the transmission of frames is to be deferred is randomly determined at an instant when the station proceeds to the back-off process. The time interval is called back-off time. That is, when another station finishes using the channel, after the station checks that the channel is in an idle state during the DIFS period, in order to avoid a collision with still another station which is waiting for the transmission of frames, the station sets its back-off time by a back-off timer 270, and if the value of the back-off timer 270 is reduced to become '0', then the station can transmit data. In fact, before a relevant station transmits frames, it is not only deterred for the back-off time, but is also additionally deterred by a time interval for which the channel is in a busy state while the station is in the back-off process. Namely, after a relevant station initially sets its back-off time by the back-off timer 270 when it enters the back-off process, it continues to reduce the value of the back-off timer 270 only if the channel is in an idle state. If the value of the back-off timer 270 becomes '0', the relevant station transmits the frames. Hence, while the relevant station reduces the value of the back-off timer 270, determining that the channel is in an idle state, if the channel enters a busy state again, the relevant station stops the back-off timer 270, and then waits. If the channel enters an idle state again, the relevant station continues to reduce the value of the back-off timer 270 again.

Also, the CSMA/CA scheme adopts control packets, such as the RTS 220, the CTS 240, and the like, which enables each station to reserve a period of time for which each station uses a channel and to inform its neighbor stations of the relevant period of time, and inhibits another station from using transmission media during this period of time, thereby reducing the possibility of a collision among stations in a wireless channel.

The back-off timer 270 which corresponds to a timer used as a method for avoiding a collision between packets can be regarded as a defer timer, and is employed so as to avoid traffic congestion during the retransmission of packets. By using this concept, which is described in B. Kim, J. Yang, D. Zhou, and M.-T. Sun, "Energy-aware Connected Dominating Set Construction in Mobile Ad-hoc Networks", Fourteenth International Conference on Computer Communications and Networks (ICCN 2005), San Diego, Calif., October 2005, the configuration of a CDS is disclosed, and the result approximating a minimal CDS is obtained.

The construction of an existing CDS is implemented, setting a goal of configuring a minimal CDS, and its approach also doesn't consider the efficiency of the overall network due to using a unit-disc approach. In a mesh network of a WSN, since communications among sensors can be frequently accomplished for a short period of time, it is required to configure a backbone in consideration of a plan which efficiently meets this. The existing method for utilizing a timer is designed to select only the shortest path by merely selecting a distant neighbor node. In the mesh network of the WSN, because the shortest path doesn't ensure a better link quality, in configuring the CDS by using a timer, a method for constructing a backbone by considering signal quality and interference is required.

SUMMARY OF THE INVENTION

The present invention provides a method for constructing a virtual backbone in a WSN. In order to accomplish this aspect of the present invention, there is provided a method for constructing a virtual backbone in a Wireless Sensor Network (WSN) according to the present invention, including the steps of setting a 'Dominator' status for a gateway or a sink node within the WSN, setting a 'CoveredByDominator' status for each neighbor node positioned in the transmission range of a node for which the 'Dominator' status is set, and setting a 'NULL' status for each of other nodes, transmitting a beacon frame at periods from each node to neighbor nodes thereof within the WSN, receiving, by each node in the 'CoveredByDominator' status, the beacon frame from neighbor nodes thereof in the 'NULL' status, computing a time duration of a defer timer, and enabling the defer timer to operate by the computed time duration and changing, to the 'Dominator' status, a status of a node whose defer timer expires earliest among the nodes all having the 'CoveredByDominator' status.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Figure 1:
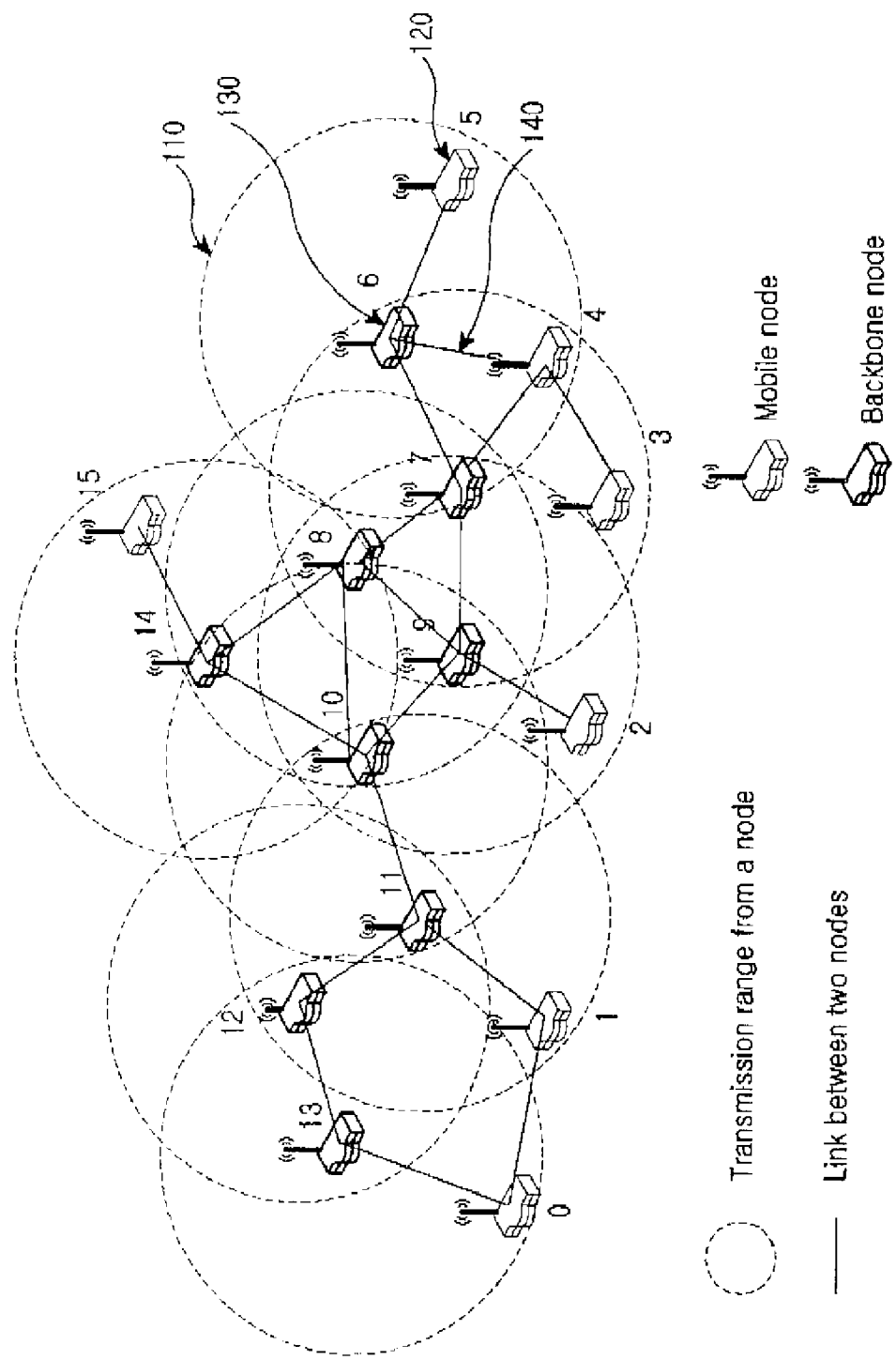
FIG. 1 is an exemplary view illustrating a backbone in a wireless ad-hoc network.
Figure 2:
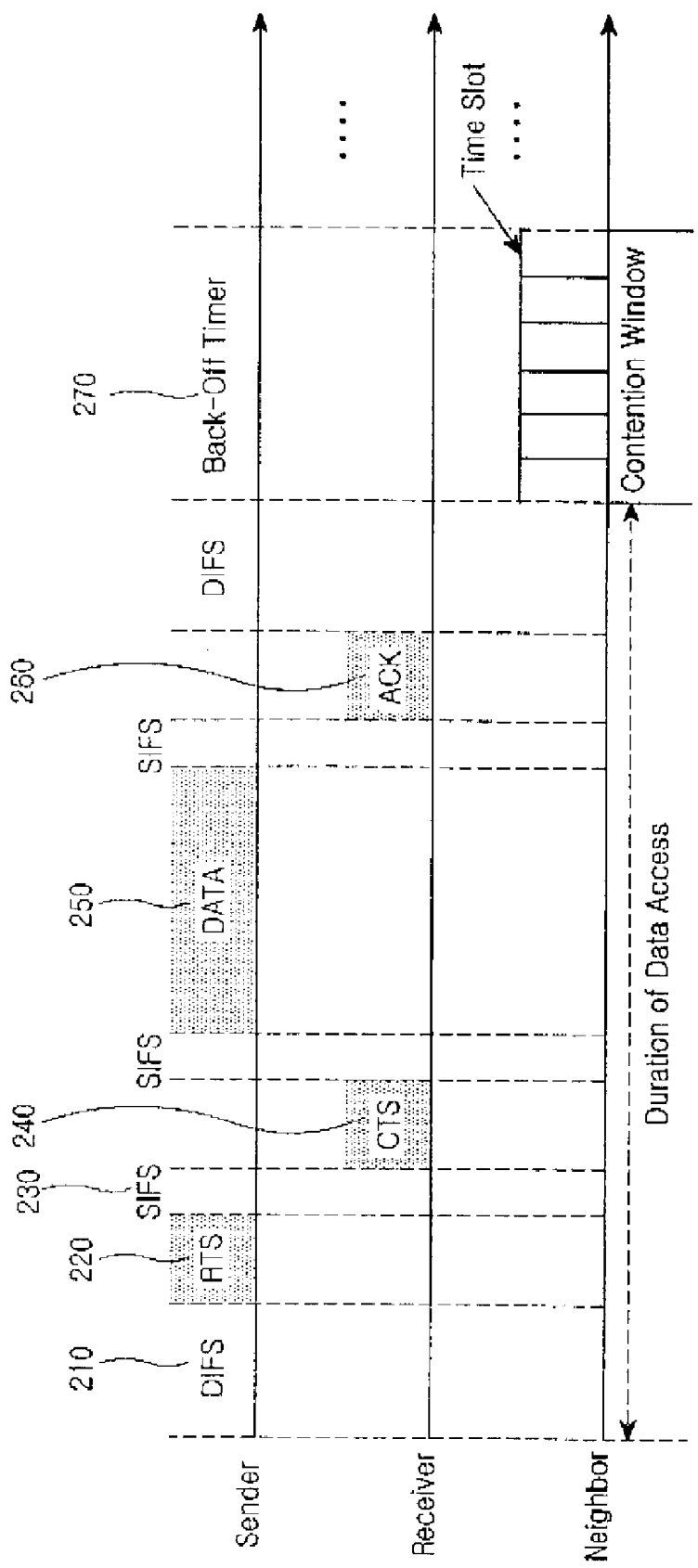
FIG. 2 is timing diagram illustrating a transmission operation of each node according to the elapse of time in a CSMA/CA scheme.

Exemplary embodiments of the present invention will be described in detail with reference to the accompanying drawings. The same elements will be designated by the same reference numerals throughout the following description and drawings although they are shown in different drawings. Further, in the following description of the present invention, a detailed description of known functions and configurations incorporated herein will be omitted when it may make the subject matter of the present invention unclear.

The present invention proposes a scheme of relieving a broadcast storm problem by utilizing a timer, in which link quality is considered in constructing a virtual backbone of a WSN and a WMN.

In the WSN, it is important to configure an efficient topology of a network on characteristics of self-organization and self-configuration. In particular, so that multi-hop relay may be successfully performed, a diversity of factors should be considered. In the present invention, a description is being made of a CDS protocol for efficiently broadcasting data packets, and methods for improving the throughput of a network in configuring a topology are being proposed.

In an embodiment of the present invention, a description is made of a method for configuring a virtual backbone or a routing protocol in a mesh network of the WSN. With the initiation of the WSN, a topology of the overall network is configured, and in turn, this constructs an efficient backbone, thereby being able to settle the broadcast storm problem. Also, the efficient backbone can be employed as a backup route of the network at the same time. An embodiment of the present invention is largely made up of three steps, including an information exchange step, a computation and processing step, and a state transition step.

Figure 3:
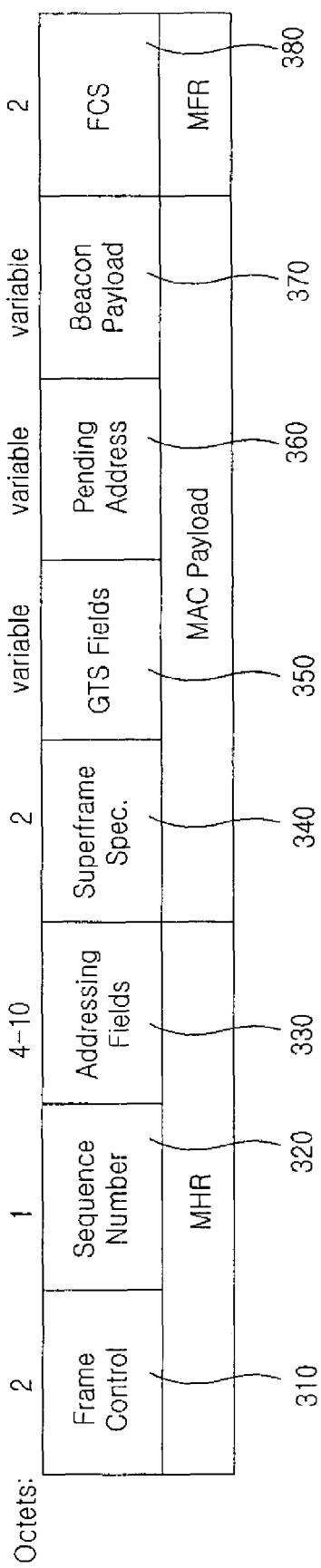
FIG. 3 is a view illustrating the structure of a beacon frame used in the general IEEE 802.15.4 standard.

FIG. 3 is a view illustrating the structure of a beacon frame used in the general IEEE 802.15.4 standard (reference: IEEE 802.15.4 specification, 2003). With reference to FIG. 3, a beacon frame used in the IEEE 802.15.4 standard includes a field of a frame control 310, a field of a sequence number 320, addressing fields 330, an MAC payload, and a field of a Frame Check Sequence (FCS) 380. The MAC payload includes a superframe spec. 340, GTS fields 350, a pending address 360 and a beacon payload 370, and has a variable length, such as a maximum length of 114 bytes and a minimum length of 102 bytes. Data carried in the MAC payload includes information representing a type of an individual frame. The FCS field 380 corresponds to a field having a 16-bit Cycle Redundancy Code (CRC), and detects an error.

In an embodiment of the present invention, exchange of information (e.g., the status of a node) is preformed through a beacon, and since an existing beacon frame is not changed, an overload is not generated in the network. The computation and processing step is related to the expiration of a defer timer as described above, and has such a configuration that the values of two parameters, such as the number of neighbor nodes and signal strength, are used to expire the defer timer in order to select an optimal node as a dominator. In the state transition step, each node changes its state according to its own role. Hereinafter, a description will be specifically made by respective steps of a method for constructing a virtual backbone according to an embodiment of the present invention.

Essential factors of the configuration topology of the WSN can refer to minimal information utilization and a distributed system. The design of a network layer must be accomplished at a level of raising the efficiency of the overall network. In the present invention, a distributed approach using a concept of a timer is adopted, and has such an advantage as constructing a backbone by using only 1-hop-away information. In addition, a CDS which approximates the optimum conditions can be configured, and the throughput of the overall network can be improved.

Information Exchange Step

Each node exchanges information with its neighbor nodes through the periodic exchange of a beacon frame. The beacon frame includes Identification (ID) information including address information of a node, location information, and status information, and collects only 1-hop away localized information.

In an embodiment of the present invention, either a 'NULL', a 'Dominator', or a 'CoveredByDominator' is set for the status of each node within a network according to features of the present invention.

The 'NULL' status represents an initial state of the network, and when a node is initially connected to the network, or when a dominator of a node itself disappears, the node is set to the 'NULL' status. If a specific node transitions to the 'Dominator' status, each of the nodes having the 'NULL' status among neighbor nodes of a 'Dominator' node is set to the 'CoveredByDominator' status. The configuration of a topology is formed in the structure of a tree and mesh, centering a sink node or a gateway over the network. The starting point of the topology configuration is a sink node and a gateway, and both the sink node and the gateway always have 'Dominator' statuses.

Figure 4:
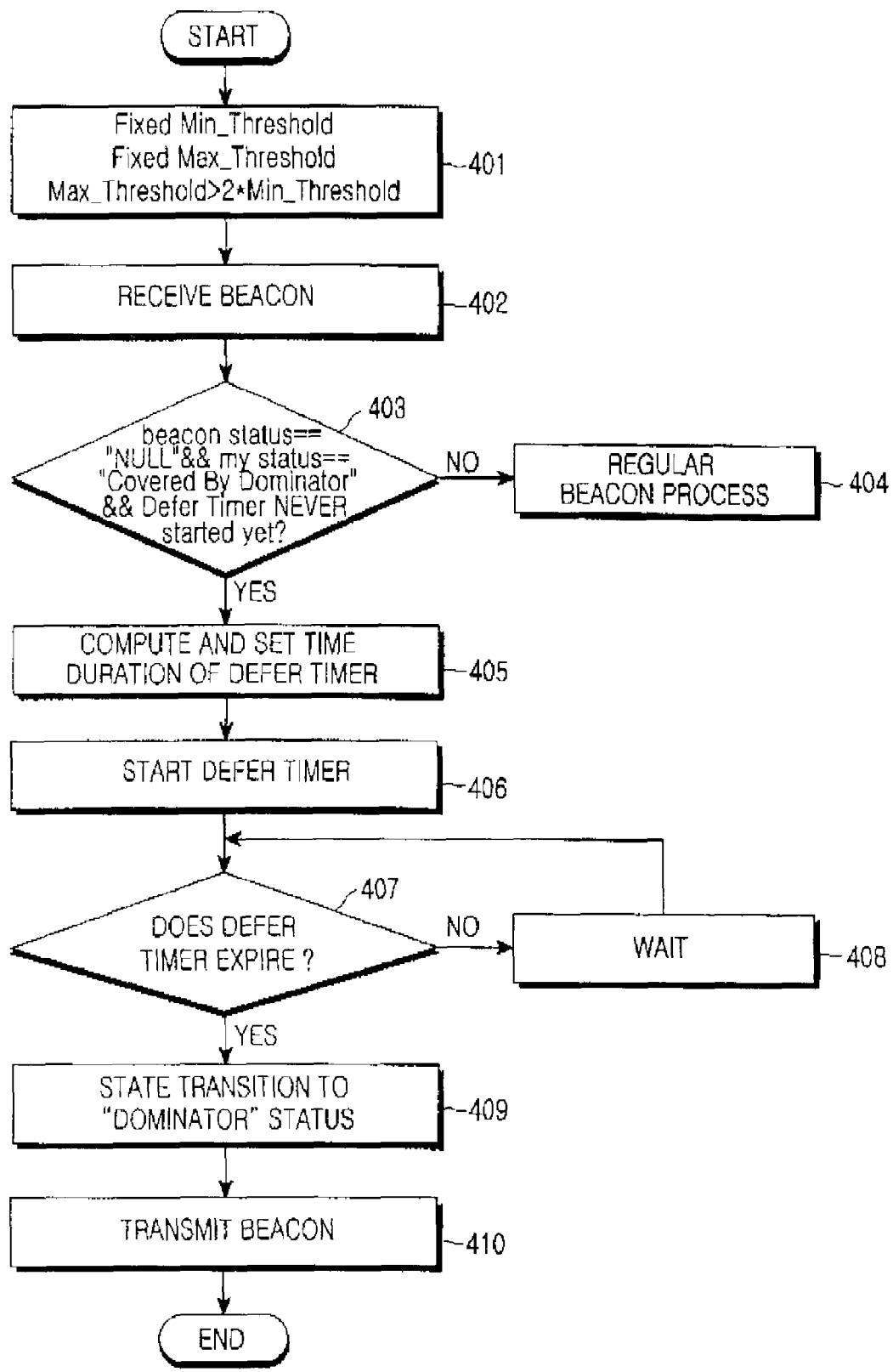
FIG. 4 is a flowchart illustrate an operation for constructing a virtual backbone in a WSN according to an embodiment of the present invention.

FIG. 4 is a flowchart illustrate an operation for constructing a virtual backbone in a WSN according to an embodiment of the present invention. FIG. 4 illustrates an operation process which is developed while receiving a beacon frame, including the 'NULL' status, in a case where neighbor nodes in a 'NULL' status exist with respect to a node in a 'CoveredByDominator' status. Referring to FIG. 4, a Fixed Min_Threshold corresponds to a period of a beacon frame, and a Fixed Max_Threshold corresponds to a maximum value of a defer timer. A period of the Fixed Max_Threshold is set to the value which is longer than that of a usual beacon frame so as to fully collect information of neighbor nodes.

In step 401, a node sets the value of the Fixed Min_Threshold and the value of the Fixed Max_Threshold so that Max_Threshold may be larger than 2×Min_Threshold. In step 402, the node receives a beacon frame from a neighbor node. In step 403, the node determines if the status of the received beacon frame corresponds to a 'NULL' status, the status of the relevant node which currently receives the beacon frame corresponds to a 'CoveredByDominator' status, and a defer timer does not yet start. If not, the node proceeds to step 404, and performs an original regular beacon process. However, if it is determined in step 403 that the status of the received beacon frame corresponds to the 'NULL' status, the status of the relevant node which currently receives the beacon frame corresponds to the 'CoveredByDominator' status, and the defer timer does not yet start, the node proceeds to step 405 to compute a time duration of the defer timer, and sets a computed time duration for the defer timer. In step 406, the node enables the defer timer to operate for the time duration which has been computed in step 405. In step 407, the node checks if the defer timer finishes expires. If not, the processing proceeds to step 408, and then waits. However, if the defer timer finishes its operation, the processing proceeds to step 409, and then the status of the relevant node transitions to a 'Dominator' status. In step 410, the relevant node transmits, to neighbor nodes thereof, a beacon frame including information of the relevant node whose status has transitioned.

Computation and Processing Step

Each node having the 'CoveredByDominator' status receives the beacon frame including the 'NULL' status, and then, enables a defer timer to operate. After the defer timer expires, state transition is generated. This sets a goal of causing a node to be selected as a dominator, as a defer timer of a node having the best requisite expires first of all, thereby enabling the node having the best requisite to be selected as a dominator of other nodes. If one node is first selected as a dominator, among neighbor nodes of the node selected as a dominator, each node having the 'NULL' status changes its status to the 'CoveredByDominator' status. In this selection, an essential element corresponds to setting time duration of the defer timer, and the time duration is set by using equation (1) below. Among parameters used to set the time duration of the defer timer, a parameter of the number of neighbor nodes corresponds to an element used to consider interference, and is a parameter for maximizing the efficiency of broadcast by enabling a node having multiple neighbor nodes to be selected as a dominator first. The second parameter corresponds to signal strength, and is a parameter for improving direct throughput by a comparison of actual link quality. $T_{duration}$ (i.e., the time duration of a timer) can be set by using respective different weights α and β(=1−α). The $T_{duration}$ can be defined by equation (1).

$$T_{duration} = \text{Max\_Threshold} \times 1/[(\text{the number of neighbor nodes})^\alpha \times (\text{signal strength})^\beta] \quad (1)$$

If α is given a heavy weight, it gives priority to the shortest path, and can then reduce the number of hops from an information source to a destination. However, this may cause a bottleneck situation to the overall network, and these problems can be settled by selecting an adequate β.

State Transition Step

Figure 5:
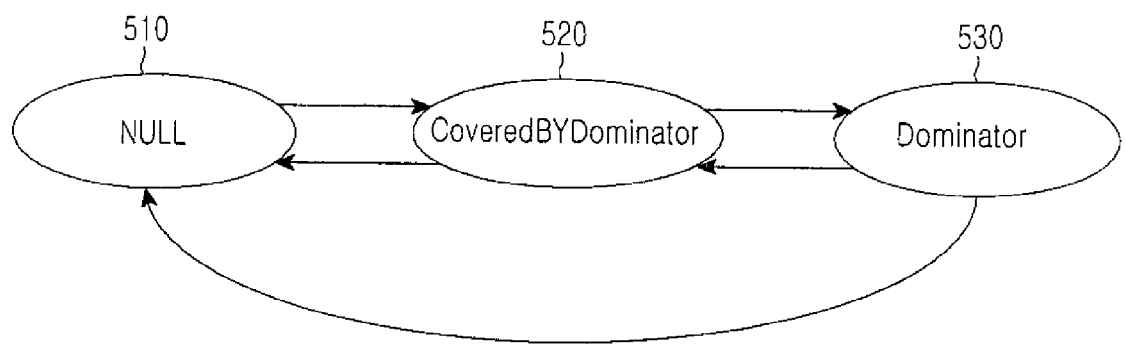
FIG. 5 is a flowchart illustrating the state transition of each node in a method for constructing a virtual backbone in a WSN according to an embodiment of the present invention.

FIG. 5 is a flowchart illustrating the state transition of each node in a method for constructing a virtual backbone in a WSN according to an embodiment of the present invention. Each node has its own status, and the status corresponds to either 'NULL' 510, 'CoveredByDominator' 520, or 'Dominator' 530. The 'NULL' 510 signifies an initial status, and when a node is connected to a network for the first time, or when a dominator of the node itself disappears, the node maintains the 'NULL' 510 status. However, a gateway directly maintains the 'Dominator' 530 status without keeping the 'NULL' 510 status, and centering the gateway, the selection of a dominator in the next step is continually performed. If a node changes its status to 'Dominator' 530, the node transmits its state transition to its neighbor nodes through a beacon frame, and each node having the 'NULL' 510 status among the neighbor nodes immediately transitions to the 'CoveredByDominator' 520 status. In this step, if each node having the 'CoveredByDominator' 520 has neighbor nodes having the 'NULL' 510 status, progress is made from the computation and processing step. At this time, after computing $T_{duration}$, each node enables its defer timer to operate, and selects a subordinate dominator. In this manner, until there are no nodes all having the 'NULL' 510 status, with the gateway as the starting point, in the overall network, a CDS having the structure of a tree & mesh is selected.

The merits and effects of exemplary embodiments, as disclosed in the present invention, and as so configured to operate above, will be described as follows.

A method according to the present invention enables constructing a CDS in consideration of link quality, and avoids a collision in advance over a network, thereby accomplishing effects such that the throughput and the efficiency of the overall network can be raised.

Above all, the method selects a node having a plurality of neighbor nodes as a dominator, and can reduce the size of the CDS as well as the whole interference of the network. Also, by utilizing the value of signal strength, the method selects a link securing enough bandwidth, and can improve the throughput of the overall network. Furthermore, a method for utilizing a timer, used in the present invention can be immediately applied in a distributed system, and has effects in that a protocol itself can handle mobility of a node.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims. Although the specific names of the states of the nodes are referred to herein, it would be recognized by those skilled in the art that the names are only for purposes of describing the invention and the scope of the invention is not to be considered limited to these names only Rather functions that are represented by these names would be recognized as being within the scope of the invention described. For example, it would understood that a Dominator status node may represent a master server and that neighbouring nodes (client servers or client routers, etc.) may be represented by the CoveredByDominator status.

What is claimed is:

1. A method for constructing a virtual backbone in a Wireless Sensor Network (WSN), the method comprising: setting a 'Dominator' status for a gateway or a sink node within the WSN, setting a 'CoveredByDominator' status for each neighbor node positioned in the transmission range of a node for which the 'Dominator' status is set, setting a 'NULL' status for each of other nodes, transmitting a beacon frame by periods from each node to neighbor nodes thereof within the WSN; receiving, by each node having the 'CoveredByDominator' status, the beacon frame from neighbor nodes having the 'NULL' status, computing a time duration of a defer timer, and enabling the defer timer to operate by the computed time duration; and changing, to the 'Dominator' status, a status of a node whose defer timer expires earliest among the nodes having the 'CoveredByDominator' status, wherein computing the time duration of the defer timer utilizes a value of signal strength and a quantity of neighbor nodes; wherein computing a time of the defer timer occurs when each node having CoveredByDominator status recovers a beacon frame from neighbor nodes having a null status, respectively, wherein the value of signal strength indicates a wireless link quality, and wherein an exchange of information is performed through the beacon without changing an existing beacon frame.

2. The method as claimed in claim 1, which further comprises changing, to the 'CoveredByDominator' status, a status of a node having the 'NULL' status among neighbor nodes of a specific node entering the 'Dominator' status.

3. The method as claimed in claim 1, wherein the beacon frame comprises Identification (ID) information including address information of a node, location information, and status information.

4. The method as claimed in claim 1, wherein neighboring nodes represent nodes 1-hop-away.

5. A method for constructing a virtual backbone in a Wireless Sensor Network (WSN), the method comprising: setting a 'Dominator' status for a gateway or a sink node within the WSN; setting a 'CoveredByDominator' status for each neighbor node positioned in the transmission range of a node for which the 'Dominator' status is set; setting a 'NULL' status for each of other nodes; transmitting a beacon frame by periods from each node to neighbor nodes thereof within the WSN; receiving, by each node having the 'CoveredByDominator' status, the beacon frame from neighbor nodes having the 'NULL' status; computing a time duration of a defer timer; and enabling the defer timer to operate by the computed time duration; and changing, to the 'Dominator' status, a status of a node whose defer timer expires earliest among the nodes having the 'CoveredByDominator' status, wherein a time duration of the defer timer is defined as:

$$T_{duration} = \text{Max\_Threshold} \times 1/[(\text{the number of neighbor nodes})^\alpha \times (\text{signal strength})^\beta],$$

where the $T_{duration}$ represents the time duration of the defer timer, the Max_Threshold represents a maximum value of the time duration of the defer timer, and $\alpha$ and $\beta$ represent weights being a predetermined value of influence of each of at least two parameters of signal strength and the number of neighbor nodes; wherein computing a time of the defer timer occurs when each node having CoverdByDominator status recovers a beacon frame from neighbor nodes having a null status, respectively, wherein the signal strength indicates a wireless link quality, and wherein an exchange of information is performed through the beacon without changing an existing beacon frame.

6. The method as claimed in claim 5, wherein the weight $\beta$ equals $(1-\alpha)$.

7. The method as claimed in claim 5, wherein the maximum value of the time duration of the defer timer is set to a value larger than double of a transmission period of the beacon frame.

8. An apparatus for constructing a virtual backbone in a Wireless Sensor Network (WSN), comprising: a processor in communication with a memory, the processor accessing code stored in said memory, the code causing the processor to execute the steps of: setting a 'Dominator' status for a gateway or a sink node within the WSN; setting a 'CoveredBy-Dominator' status for each neighbor node positioned the transmission range of a node for which the 'Dominator' status is set; setting a 'NULL' status for each of other nodes; transmitting a beacon frame by periods from each node to neighbor nodes within the WSN; receiving, by each node having 'CoveredByDominator' status, the beacon frame from neighbor nodes in the 'NULL' status; computing a time duration of a defer timer; and enabling the defer timer to operate by the computed time duration; and changing, to the 'Dominator' status, a status of a node whose defer timer expires earliest among the nodes having the 'CoveredByDominator' status, wherein computing the time duration of the defer timer utilizes a value of signal strength and a quantity of neighbor nodes; wherein computing a time of the defer timer occurs when each node having CoverdByDominator status recovers a beacon frame from neighbor nodes having a null status, respectively, wherein the value of signal strength indicates a wireless link quality, and wherein an exchange of information is performed through the beacon without changing an existing beacon frame.

9. The apparatus as claimed in claim 8, wherein the processor further executing the steps of
changing, to the 'CoveredByDominator' status, a status of a node having the 'NULL' status among neighbor nodes of a specific node entering the 'Dominator' status.

10. The apparatus as claimed in claim 8, wherein the beacon frame comprises Identification (ID) information including address information of a node, location information, and status information.

11. An apparatus for constructing a virtual backbone in a Wireless Sensor Network (WSN), comprising: a processor in communication with a memory, the processor accessing code stored in said memory, the code causing the processor to execute the steps of: setting a 'Dominator' status for a gateway or a sink node within the WSN; setting a 'CoveredBy-Dominator' status for each neighbor node positioned in the transmission range of a node for which the 'Dominator' status is set; setting a 'NULL' status for each of other nodes; transmitting a beacon frame by periods from each node to neighbor nodes within the WSN; receiving, by each node having 'CoveredByDominator' status, the beacon frame from neighbor nodes in the 'NULL' status; computing a time duration of a defer timer; and enabling the defer timer to operate by the computed time duration; and changing, to the 'Dominator' status, a status of a node whose defer timer expires earliest among the nodes having the 'CoveredByDominator' status, wherein a time duration of the defer timer is defined as:

$$T_{duration} = \text{Max\_Threshold} \times 1/[(\text{the number of neighbor nodes})^\alpha \times (\text{signal strength})^\beta],$$

where the $T_{duration}$ represents the time duration of the defer timer, the Max_Threshold represents a maximum value of the time duration of the defer timer, and $\alpha$ and $\beta$ represent weights being a predetermined value of influence of each of at least two parameters of signal strength and the number of neighbor nodes; wherein computing a time of the defer timer occurs when each node having CoverdByDominator status recovers a beacon frame from neighbor nodes having a null status, respectively, wherein the signal strength indicates a wireless link quality, and wherein an exchange of information is performed through the beacon without changing an existing beacon frame.

12. The apparatus as claimed in claim 11, wherein the weight $\beta$ equals $(1-\alpha)$.

13. The apparatus as claimed in claim 11, wherein the maximum value of the time duration of the defer timer is set to a value larger than double of a transmission period of the beacon frame.

14. The apparatus as claimed in claim 11, wherein neighboring nodes represent nodes 1-hop-away.

15. An apparatus for constructing a virtual backbone in a Wireless Sensor Network (WSN), comprising: means for: setting a 'Dominator' status for a gateway or a sink node within the WSN, setting a 'CoveredByDominator' status for each neighbor node positioned in the transmission range of a node for which the 'Dominator' status is set, and setting a 'NULL' status for each of other nodes; means for transmitting a beacon frame by periods from each node to neighbor nodes within the WSN; means for receiving, by each node having 'CoveredByDominator' status, the beacon frame from neighbor nodes in the 'NULL' status, means for computing a time duration of a defer timer, and means for: enabling the defer timer to operate by the computed time duration; and changing, to the 'Dominator' status, a status of a node whose defer timer expires earliest among the nodes having the 'CoveredByDominator' status, wherein the means for computing the time duration of the defer timer utilizes a value of signal strength and a quantity of neighbor nodes; wherein computing a time of the defer timer occurs when each node having CoveredByDominator status recovers a beacon frame from neighbor nodes having a null status, respectively, wherein the value of signal strength indicates a wireless link quality, and wherein an exchange of information is performed through the beacon without changing an existing beacon frame.

16. The apparatus as claimed in claim 15, further comprising:

means for changing, to the 'CoveredByDominator' status, a status of a node having the 'NULL' status among neighbor nodes of a specific node entering the 'Dominator' status.

17. The apparatus as claimed in claim 15, wherein the beacon frame comprises Identification (ID) information including address information of a node, location information, and status information.

18. The apparatus as claimed in claim 15, wherein neighboring nodes represent nodes 1-hop-away.

19. An apparatus for constructing a virtual backbone in a Wireless Sensor Network (WSN), comprising: means for: setting a 'Dominator' status for a gateway or a sink node within the WSN, setting a 'CoveredByDominator' status for each neighbor node positioned in the transmission range of a node for which the 'Dominator' status is set, and setting a 'NULL' status for each of other nodes, means for transmitting a beacon frame by periods from each node to neighbor nodes within the WSN; means for receiving, by each node having 'CoveredByDominator' status, the beacon frame from neighbor nodes in the 'NULL' status; means for computing a time duration of a defer timer; and means for: enabling the defer timer to operate by the computed time duration; and changing, to the 'Dominator' status, a status of a node whose defer timer expires earliest among the nodes having the 'CoveredByDominator' status, wherein a time duration of the defer timer is defined as:

$$T_{duration} = \text{Max\_Threshold} \times 1/[(\text{the number of neighbor nodes})^{\alpha} \times (\text{signal strength})^{\beta}],$$

where the $T_{duration}$ represents the time duration of the defer timer, the Max_Threshold represents a maximum value of the time duration of the defer timer, and $\alpha$ and $\beta$ represent weights being a predetermined value of influence of each of at least two parameters of signal strength and the number of neighbor nodes; wherein computing a time of the defer timer occurs when each node having CoveredByDominator status recovers a beacon frame from neighbor nodes having a null status, respectively, wherein the signal strength indicates a wireless link quality, and wherein an exchange of information is performed through the beacon without changing an existing beacon frame.

20. The apparatus as claimed in claim 19, wherein the weight $\beta$ equals $(1-\alpha)$.

21. The apparatus as claimed in claim 19, wherein the maximum value of the time duration of the defer timer is set to a value larger than double of a transmission period of the beacon frame.

* * * * *